(12) United States Patent
Bies

(10) Patent No.: US 8,591,271 B2
(45) Date of Patent: Nov. 26, 2013

(54) ELECTRICAL CONNECTION TERMINAL

(75) Inventor: Henryk Bies, Sondershausen (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 270 days.

(21) Appl. No.: 13/070,745

(22) Filed: Mar. 24, 2011

(65) Prior Publication Data

US 2011/0250803 A1    Oct. 13, 2011

(30) Foreign Application Priority Data

Apr. 7, 2010   (DE) .......................... 10 2010 014 144

(51) Int. Cl.
*H01R 11/22* (2006.01)
*H01R 13/11* (2006.01)

(52) U.S. Cl.
USPC .......................................... 439/852; 439/725

(58) Field of Classification Search
USPC .............. 439/725, 752.5, 877, 850, 849, 884, 439/852, 851, 853, 856
See application file for complete search history.

(56) References Cited

U.S. PATENT DOCUMENTS 4,299,436 A * 11/1981 Ackerman .................... 439/853
7,513,793 B2   4/2009 Horst et al.
2002/0098743 A1 * 7/2002 Schell et al. .................. 439/850

FOREIGN PATENT DOCUMENTS

DE        197 35 835        2/1999

* cited by examiner

*Primary Examiner* — Javaid Nasri
(74) *Attorney, Agent, or Firm* — Renner, Otto, Boisselle & Sklar, LLP

(57) ABSTRACT

An electrical connection terminal provides secure clamping of an electrical conductor and at the same time has a simple structure. Simple and effective conductor guidance is achieved on account of a funnel-like conductor insertion region being composed of an insulating material housing and a contact frame. The contact frame can be of very simple, compact and material-saving design.

11 Claims, 5 Drawing Sheets

ELECTRICAL CONNECTION TERMINAL

The invention relates to an electrical connection terminal for the clamping connection of at least one electrical conductor, having a contact frame which is accommodated in an insulating material housing and is stamped out from a flat metal material and is formed in the form of a channel with at least two side walls and a contact base, with the contact frame, for the purpose of forming a conductor clamping connection, having on each side wall in each case a leaf spring in the form of a tongue which is formed from the flat metal part and which is bent out of the plane of the flat metal part in such a way that the free end of the leaf spring forms a clamping edge which is directed toward the electrical conductor, and having a funnel-like conductor insertion region which tapers at least in sections in the direction of a clamping point which is formed by the clamping edge, with the conductor insertion region adjoining a conductor insertion opening in the insulating material housing in the conductor insertion direction.

Prior art

DE 197 35 835 B4 discloses an electrical terminal for the connection of an electrical conductor having a tunnel-like insertion region which is adjoined by two lateral leaf springs which face one another for the purpose of holding the electrical conductor in a clamped manner. The clamping point can be opened by means of a push element, which acts from above and pushes on run-on slopes which are integrally formed on the leaf springs, so that the conductor can be removed again. A conductor to be inserted is not adequately guided in the region of the leaf springs in particular, and this may lead to unsecure clamping of said conductor.

U.S. Pat. No. 7,513,793 also describes a connection terminal for an electrical conductor having a plug-type contact which has a cylindrical, substantially closed contact frame for accommodating the conductor and a slot within the cylindrical region. Furthermore, the cylindrical region has a clamping tongue within the slot for clamping the conductor and the cylindrically designed contact frame is provided with a funnel-like insertion region for the electrical conductor. The contact frame is therefore of highly complicated design.

Furthermore, U.S. Pat. No. 4,299,436 discloses a connection terminal which can be mounted on a printed circuit board and is bent out of an integral metal part. In this case, the connection terminal is in the form of a substantially continuously closed rectangular tubular contact frame with end-face contact sections facing the printed circuit board. A leaf spring tongue in each case projects from the lower face and the upper face of the tunnel-like component offset in the direction of the tunnel interior, it being possible for an electrical conductor to be accommodated in a clamped manner between the ends of the leaf springs, and therefore a relatively complicated design of the contact frame with a high metal content is provided in this case too.

OBJECT OF THE INVENTION

The object of the invention is to provide an electrical connection terminal for the connection of an electrical conductor, which electrical connection terminal ensures secure clamping of the electrical conductor and at the same time has a simple structure.

DISCLOSURE OF THE INVENTION

According to the invention, the object is achieved by the features of claim 1. According to said claim, provision is made for an electrical connection terminal for the clamping connection of at least one electrical conductor, said electrical connection terminal having a contact frame which is accommodated in an insulating material housing and is formed (for example stamped out) from a flat metal material and is shaped in the form of a channel with at least two side walls and a contact base, with the contact frame, for the purpose of forming a conductor clamping connection, having on each side wall in each case a leaf spring in the form of a tongue, which is formed (for example stamped out) from the flat metal part and which is bent out of the plane of the flat metal part in such a way that the free end of the leaf spring forms a clamping edge which is directed toward the electrical conductor, and having a funnel-like conductor insertion region which tapers at least in sections in the direction of a clamping point which is formed by the clamping edge, with the conductor insertion region adjoining a conductor insertion opening in the insulating material housing in the conductor insertion direction, for, according to the invention, the conductor insertion region which is in the form of a funnel at least in sections to be at least virtually closed over the circumference, and for the funnel-like conductor insertion region to be formed jointly from the contact frame and by the insulating material housing.

Simple and effective conductor guidance is achieved on account of the funnel-like conductor insertion region being composed of the insulating material housing and the contact frame or being formed by these two components, it being possible, in particular, for the contact frame to be of very simple, compact and material-saving design. The conductor insertion region can therefore also be varied in a simple manner as required and matched to the various requirements since the two components can be considered to be separate from one another.

In a preferred embodiment, the contact frame has a contact base which is bent out of the plane of the flat metal part and is inclined toward an inserted electrical conductor in the conductor insertion direction.

According to a further preferred embodiment, the insulating material housing has a housing inner wall in the region of the conductor insertion region, said housing inner wall being inclined toward an inserted electrical conductor in the conductor insertion direction.

By virtue of this embodiment, the contact base and the housing inner wall, as part of the funnel-like conductor insertion region, can be matched to the required conditions separately from one another. Therefore, the conductor insertion region can, as viewed in cross section, be, for example, straight or bent in the region of the contact base and/or the housing inner wall, as a result of which individual and rapid matching is made possible.

According to a further preferred embodiment, the contact frame has, for the purpose of simple connection of the electrical connection terminal to a printed circuit board, for example by means of an SMD solder connection, two contact regions. Contact is made with at least one conductor track on a printed circuit board by way of the contact regions. In this case, the contact regions, preferably in the longitudinal extent of the contact frame, adjoin the front and rear ends of said contact frame.

For the purpose of forming the clamping edge, the free end of the leaf spring is preferably turned out in a manner directed toward the electrical conductor. This creates an optimum clamping connection since the clamping edge can interengage with the electrical conductor through the set clamping angle in an optimum manner.

In each case one run-on slope which is directed toward the outer face of the electrical terminal is integrally formed on the leaf springs, said run-on slopes being turned out in relation to one another in the form of a funnel. The clamping point can be opened by means of these run-on slopes by it being possible for the leaf springs to be pushed apart in a simplified manner via the run-on slopes by means of an operating means. In this way, inserted electrical conductors can either be easily removed or inserted in a simplified manner. Therefore, multi-wire conductors, in particular, can be used for this electrical connection terminal.

The operating element used to open the clamping point is preferably a push element which is integrally formed on the insulating material housing, it being possible for said push element to be pushed in between the leaf springs via the run-on slopes of the contact frame which are turned out in relation to one another in the form of a funnel, in order to open the clamping connection of the electrical conductor by pushing apart the leaf springs.

In a further preferred embodiment, the contact frame is connected to the insulating material housing by means of at least one latching connection. This creates a permanent fixed connection between the contact frame and the insulating material housing which is simple to handle.

In order to effectively prevent the leaf springs and/or the push element from being damaged, in particular fractured, an overload protection means is provided for said component in one preferred embodiment. In this case, the deflection of the leaf springs can advantageously be limited by side walls and/or intermediate walls of the insulating material housing. It is further advantageous for the deflection of the push element arm of the push element to be limited by abutment of the push element arm against at least one leaf spring. These embodiments make it possible to provide overload protection without significantly adapting the electrical connection terminal, and are therefore cost-effective.

BRIEF DESCRIPTION OF THE DRAWINGS

The invention will be explained in greater detail below with reference to an exemplary embodiment which is illustrated in the figures, in which FIG. 7: is a sectional illustration through the connection terminal according to the invention in accordance with section VII-VII from FIG. 5a.

EMBODIMENT OF THE INVENTION

Figure 1:
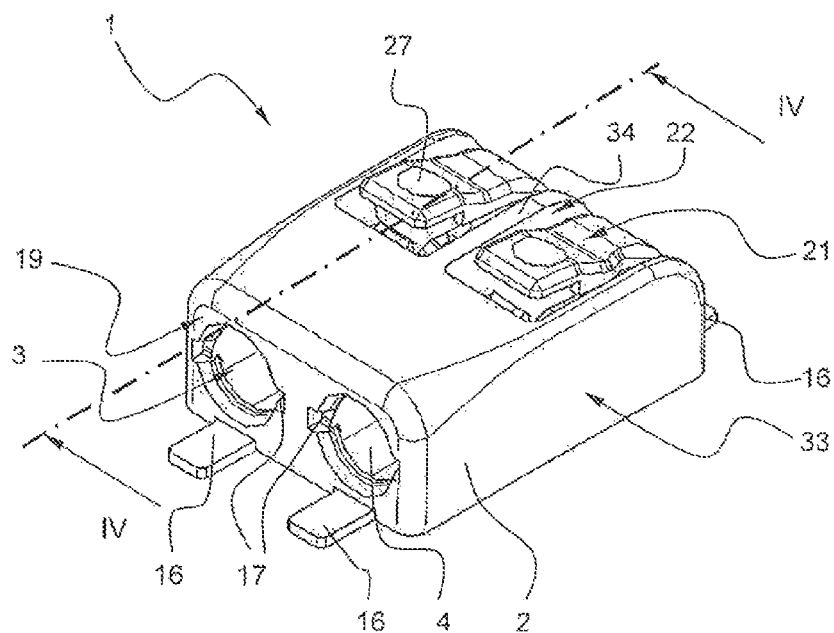
FIG. 1: is a perspective illustration of a connection terminal according to the invention in the assembled state.
Figure 4:
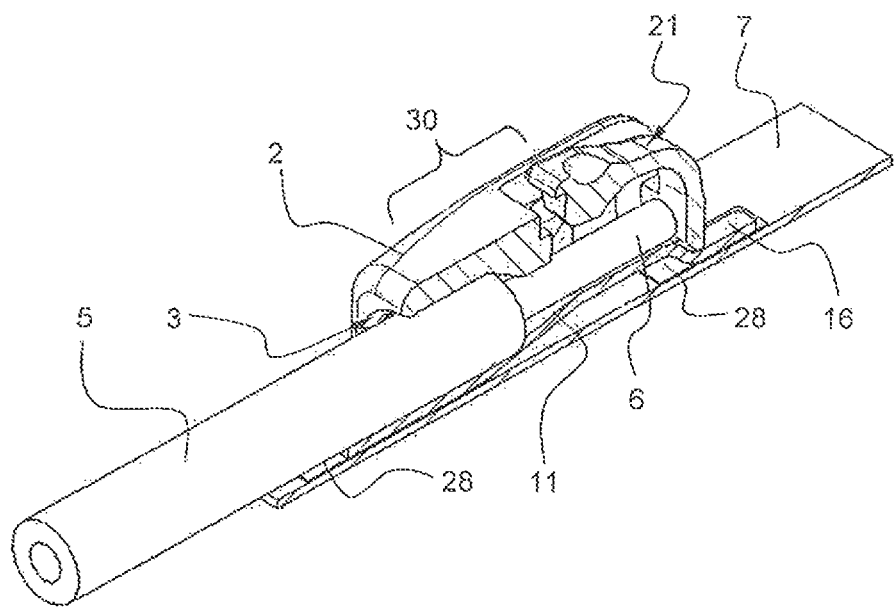
FIG. 4: is a perspective sectional illustration through the connection terminal according to the invention which is arranged on a printed circuit board and has an electrical conductor inserted.

FIG. 1 shows an electrical connection terminal 1 according to the invention having an insulating material housing 2 in which a metal contact frame 4 is accommodated. The insulating material housing 2 has, at an end face 19, at least one conductor insertion opening 3 for the insertion of an electrical conductor 5 (FIG. 4). In the illustrated exemplary embodiment, the connection terminal 1 is of two-pole design with in each case one conductor insertion opening 3 and a contact frame 4 for each pole. However, the connection terminal may also have any other desired number of poles.

Figure 2:
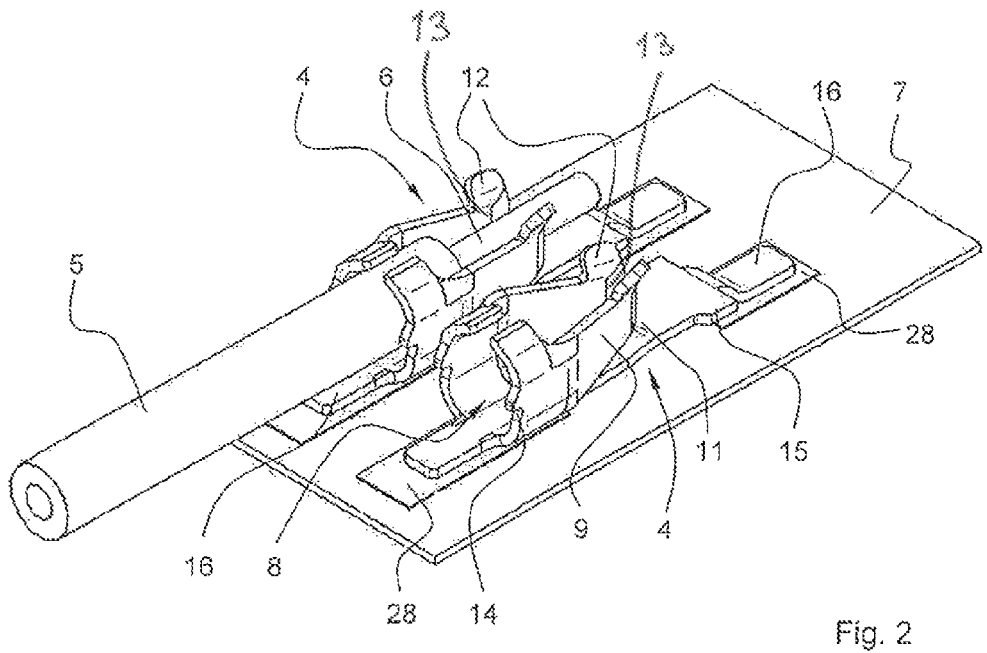
FIG. 2: shows a connection terminal according to the invention which is arranged on a printed circuit board and has a conductor inserted, but without the insulating material housing.

Also shown in FIG. 1 are connection regions 16 of the contact frame 4 which make contact with corresponding contact sections 28, for example conductor tracks, of a printed circuit board 7 (FIG. 2). In this case, the connection regions 16 are connected to the contact sections 28 in particular via solder connections (SMD solder connection), but a plug-type connection is also feasible. FIG. 2 shows the contact frame 4 mounted on the printed circuit board 7. In the illustration, the insulating material housing has been dispensed with so that the connection of the electrical conductor 5 to the contact frame 4 can be seen. The electrical conductor 5 is inserted through a channel inlet 8, which inlet is bent in the form of a ring and is of at least virtually closed design, in the contact frame 4, with the end 6, which is stripped of insulation, of the electrical conductor 5 being accommodated between the side walls, which are in the form of leaf springs 9, of the channel-like contact frame 4. In this case, the leaf springs 9 are bent out of a flat metal part and the free ends of said leaf springs form a clamping edge 10, and therefore the two opposing clamping edges 10 of the leaf springs 9 form a clamping point for the electrical conductor 5. The region from the channel inlet 8, which adjoins the conductor insertion opening 3, in the contact frame 4 to the clamping point, which is formed by the clamping edges 10, defines a conductor insertion region 30 in this case.

Figure 3:
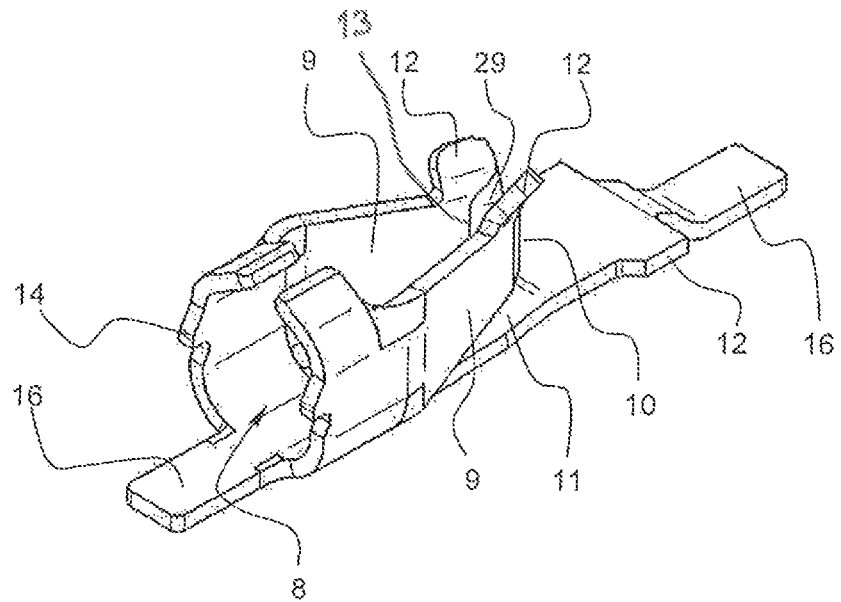
FIG. 3: shows a perspective view of the contact frame.

The structure of the contact frame 4 can be clearly seen in FIG. 3 which shows that, in order to form the clamping edge 10 at the free end of the leaf spring 9, an additional turned-out portion 13 which is directed toward the electrical conductor 5 is impressed or integrally formed in order to improve the clamping action. The contact frame 4 also has a contact base 11 which protrudes from or is bent out of the surface of a flat metal part in such a way that it is designed so as to be inclined from the channel inlet 8 in the direction of the clamping point, that is to say substantially in the conductor insertion region 30, so as to rise in the direction of an inserted conductor 5. A first contact region 16 adjoins one end of the contact base 11 at the channel inlet 8 and a second contact region 16 adjoins the other end of said contact base. In addition, front latching hooks 14 which are integrally formed on the annular channel inlet 8 are shown in FIG. 3, said front latching hooks, for the purpose of latching connection to the insulating material housing 2, engaging in corresponding front latching recesses 17 which are arranged in said insulating material housing next to the conductor insertion opening 3. Rear latching hooks 15, which are arranged laterally on the contact base 11 and are preferably spaced apart from the printed circuit board 7 or from the plane formed by the contact regions 16 and engage in latching recesses (not illustrated) in the insulating material housing 2, are provided on the contact base 11 in the region between the clamping point, which is formed by the clamping edges 10, and the rear contact region 16 which is averted from the annular channel inlet.

In the region of the free end of the leaf springs 9, at which free end the clamping edge 10 is formed in each case, the leaf spring 9 in each case has a run-on slope 12 on its longitudinal face which is averted from the contact base 10, said run-on slope in each case being directed toward the outer face or the housing upper face 18 of the connection terminal 1. The run-on slopes of a contact frame 4 therefore together form an upwardly directed funnel-like receptacle which is averted from the contact base 10.

Figure 5A:
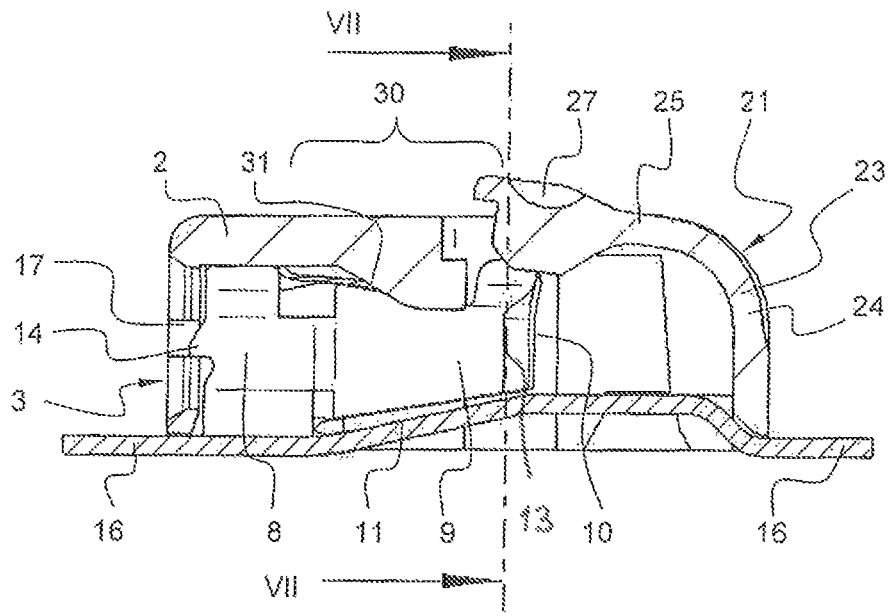
FIG. 5a: is a sectional illustration through the connection terminal according to the invention in accordance with section IV-IV from FIG. 1 with the push element not operated.
Figure 5B:
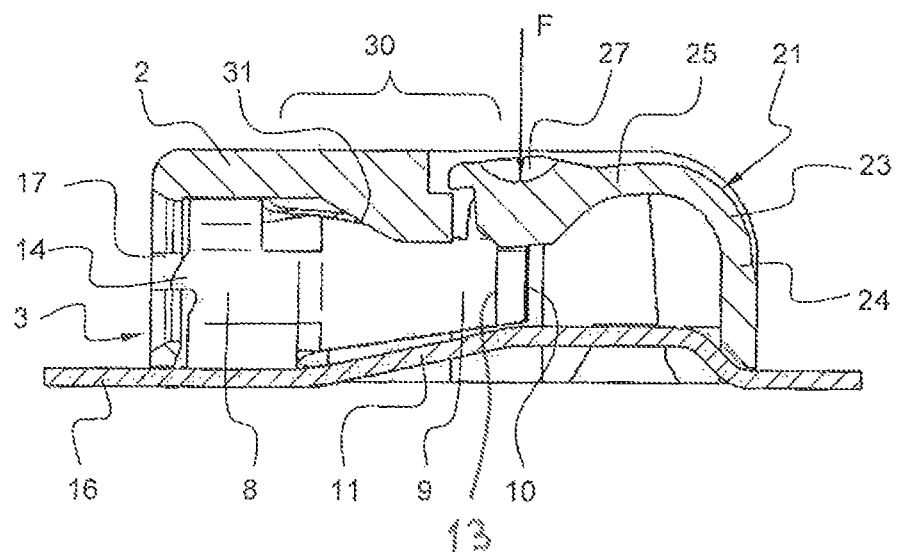
FIG. 5b: is a sectional illustration through the connection terminal according to the invention in accordance with section IV-IV from FIG. 1 with the push element operated.

FIGS. 4 and 5a and 5b are in each case sectional illustrations of the electrical connection terminal 1 according to the invention which is composed of a contact frame 4 and an insulating material housing 2, with a connected electrical conductor 5 additionally being illustrated in FIG. 4. Said figures show that the housing inner wall 31 has an oblique region within which the housing inner wall 31 is designed to be inclined toward an inserted conductor 5. This inclined region is situated within the above-defined conductor insertion region 30 or can also extend over the entire conductor insertion region 30.

Said illustrations also show that the conductor insertion region 30 has, on account of the design of the contact frame 4 with its leaf springs 9 and its contact base 11 and the housing inner wall 31 of the insulating material housing 2, a form which is funnel-like at least in sections, it being clear that the funnel-like conductor insertion region 30 is composed of the contact frame 4 and the insulating material housing 2. In this case, the funnel-like conductor insertion region 30 is at least virtually completely closed over the circumference. Narrow gaps are present only between the leaf springs 9 and the contact base 11 on the one hand and the leaf springs 9 and the housing inner wall 31 on the other. In the exemplary embodiment, the cross section of the conductor insertion region 30 is of substantially rectangular or square design, but can also have any desired other shape, in particular be round or at least round or bent in sections.

In this case, the funnel-like conductor insertion region 30 forms a guide for an electrical conductor 5 to be inserted, in particular for the end 6 of said electrical conductor which is stripped of insulation, and therefore the end which is stripped of insulation can be fed to the clamping point in a targeted manner. The electrical connection terminal 1 can also be used for multi-wire electrical conductors 5, in particular when the clamping point, which is formed by the clamping edges 10, is opened by an operating element, which is in the form of a push element 21, before insertion of the electrical conductor 5. On account of the conductor insertion region 30 which is virtually closed over the circumference, the individual wires of the multi-wire conductor 5 cannot yield and are securely held in a clamped manner by the clamping edge 10. The end, which faces the conductor insertion opening 3, of the funnel-like section of the conductor insertion region 30 with the larger cross section can also, if desired, serve as a stop for the the insulated section of the electrical conductor 5.

Simple and effective conductor guidance is achieved on account of the funnel-like conductor insertion region 30 being composed of the insulating material housing 2 and the contact frame 4 or being formed by these two components, it being possible for, in particular, the contact frame 4 to be of very simple, compact and material-saving design.

FIGS. 4, 5a and 5b also show a push element 21 as an operating element with a push element arm 23 which is designed integrally with the insulating material housing 2. In this case, the push element 21 acts on run-on slopes 12 and, when operated, pushes apart these run-on slopes 12 together with the leaf springs 9, that is to say in the direction of the insulating material housing 2 when pushed in with a force F. Therefore, the clamping edges 10 of the leaf spring 9 are also pushed apart and the clamping point for removing an electrical conductor 5 or for inserting an electrical conductor 5, in particular a multi-wire conductor 5, is opened.

Figure 6A:
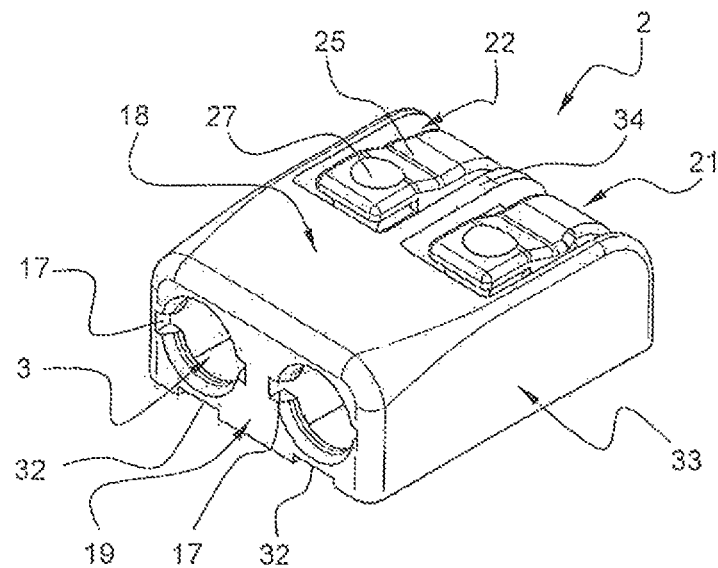
FIG. 6a: shows a first perspective view of the insulating material housing.
Figure 6B:
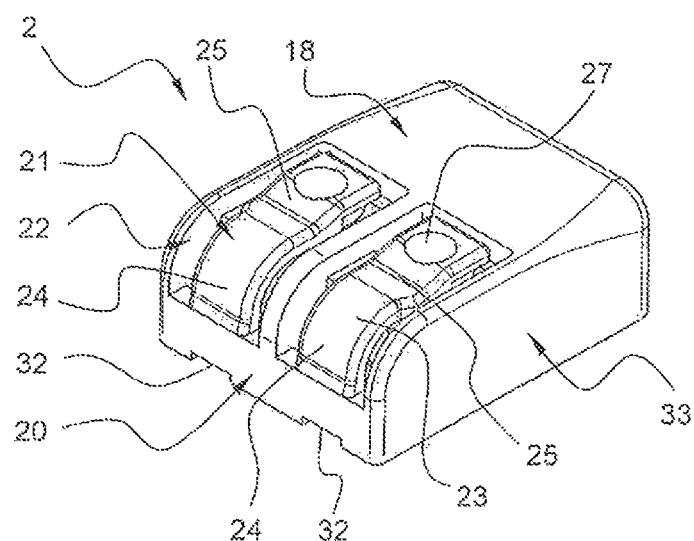
FIG. 6b: shows a second perspective view of the insulating material housing.

In accordance with the illustration in FIGS. 6a and 6b, the push element arm 23 is integrally formed on the insulating material housing 2 in the region of the housing rear face 20, preferably in the lower half thereof which is averted from the housing upper face 18. In this case, the push element arm 23 follows the contour of the insulating material housing 2, and therefore a first push element arm part 24, which is joined to the housing rear wall 20, runs approximately in the plane of the housing rear face 20 or approximately parallel thereto. In the further course, the contour of the push element arm 23 follows the contour of the transition from the housing rear face 20 to the housing upper face 18, and therefore a second push element arm part 25, which is integrally connected to the first push element arm part 24, runs approximately in the plane of the housing upper face 18 or approximately parallel thereto. In this case, the housing rear face 20 and the housing upper face 18 are arranged at an angle to one another, and preferably the housing rear face 20 and the housing upper face 18 are arranged at least virtually at right angles to one another. The push element arm 23 is therefore substantially in the form of an elbow. The second push element arm part 25 has an operating surface 27 integrally formed on its end which is averted from the first push element arm part, said operating surface being in the form of a hollow in the present exemplary embodiment, but it being possible for said operating surface to assume any other desired shape, for example to be in the form of a slot or a crossed slot. This shows that the push element 21 is arranged in a housing recess 22 which extends over the housing rear face 20 and the housing upper face 18. In this case, the housing recess 22 is substantially designed as an aperture, and therefore the push element 21 can act on the contact frame 4 which is arranged in the interior of the insulating material housing 2. The push element in the form of an operating element is therefore integrated, with its angled design, in the wall or surface of the insulating material housing 2 and constitutes a part of the insulating material housing 2 itself.

In the non-mounted state, the push element arm 23 or the outer surface is located substantially in the plane of the surface contour of the insulating material housing 2, both in the region of the housing upper face 18 and in the region of the housing rear face 20. In the unoperated and mounted state with the contact frame inserted in the insulating material housing 2, the push element 21 protrudes, in contrast, at least in relation to the housing upper face 18 to some extent, as shown in FIG. 5a. In this case, the run-on slopes 12 of the contact frame 4 bear against the push element 21 or, more precisely, against the push element surface 26 (FIG. 7) thereof, and deflect the push element 21 outward, and therefore the push element arm 23 is under elastic prestress. FIG. 5b illustrates the operated state, in which the push element 21 is acted on by an operating force F in the region of the hollow-like operating surface 27. It can be seen that the push element arm 23 deforms elastically in a substantially uniform manner under the operating force F, with the region of the push element 21 entering between the leaf springs 9 by way of the operating surfaces 26. The push element arm 23 has a substantially uniform thickness for uniform elastic deformation. During the operating process, that is to say as the push element 21 is pushed in, the push element 21 is displaced out of the position in which it protrudes beyond the housing upper face 18 and into a position in which the push element arm 23, in particular the second push element arm part 25, enters the insulating material housing 2. In this case, the elastic prestress of the push element arm 23 is lifted and the push element arm 23 is subject to reverse stress, and therefore the push element arm attempts to move outward again in order to reach its starting position.

FIGS. 6a and 6b illustrate the insulating material housing 2 as an individual part, with, in particular, the described form of the push element 21 and the connection of the push element arm 23 to the insulating material housing 2 once again being clearly shown. It can also be seen that the insulating material housing 2 has, on a housing lower face, recesses 32 in which the contact regions 16 of the contact frame 4 engage, and therefore these contact regions 16 can protrude beyond the housing rear face 20 and the housing front face 19 containing the conductor insertion openings 3 (also see FIG. 1). At the same time, the housing lower face of the assembled electrical connection terminals forms a substantially flat surface without protruding components. Therefore, in the state in which it is arranged on the printed circuit board 7, the insulating material housing 2 can extend directly as far as the surface of the printed circuit board 7 or rest on the printed circuit board 7.

FIG. 7 once again illustrates the manner of operation of the push element 21 on the contact frame 4. The push element surface 26 of the push element 21 is substantially in the form of a wedge and acts on the corresponding obliquely positioned run-on slopes 12 of the contact frame 4. When the push element 21 is acted on by a force F via the operating surface 27, the wedge-like push element surface 26 slides over the run-on slopes 12, enters between the leaf springs 9 in the process, and pushes said leaf springs apart. As soon as the operating force F is withdrawn from the push element 21, the leaf springs 9, by virtue of their restoring force, push the push element 21, via the run-on slopes 12 and the operating surface 26 corresponding to these, back into the starting position again.

The illustrated angular form of the push element 21 allows a relatively long effective push element arm 23 with a correspondingly long lever arm, this being advantageous particularly in the case of restricted installation space conditions or very small electrical connection terminals with small insulating material housings. Therefore, the form of the push element 21 according to the invention actually makes it possible to provide an effective push element 21 for operating a contact frame 4 in the first place, particularly in the case of miniaturized connection terminals.

On account of the push element arm 23 being subject to a prestress in the unoperated state, the stress which acts on the push element arm 23 can be kept low. The value of the prestress is relatively low since the deflection of the push element arm 23 in the unoperated state is also relatively small. The deflection of the push element arm 23 into the insulating material housing 2 in the operated state is not significantly much higher than in the unoperated state either, and therefore the stresses to which the push element arm is subjected can also be kept relatively low. If, in contrast, the entire operating path were to be given over to a stress-free push element arm 23, the stress acting on the push element arm 23 would be significantly higher, and therefore the push element arm 23 would also have to be larger overall. Therefore, it can be seen that the push element 21 can be kept very small overall, and therefore is suitable in particular for very small connection terminals, on account of the present arrangement of the push element 21 within the connection terminal 1 and the interaction of said push element with the contact frame 4.

Figure 7:
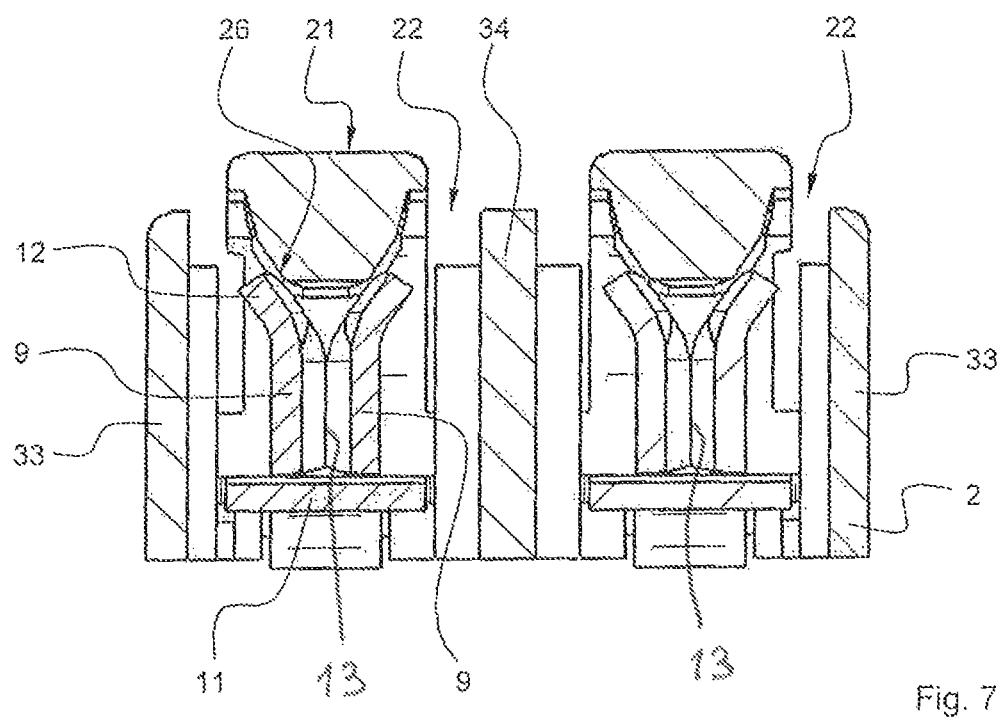

An overload protection means both for the leaf springs 9 and for the push element 21 can also be realized with the illustrated embodiment of the electrical terminal. As can be seen in FIG. 7, the run-on slopes 12 which are arranged on the leaf springs 9 butt against the side walls 33 of the insulating material housing 2 and/or one or more intermediate walls 34, which are arranged between the poles of the connection terminal 1, of the insulating material housing 2 when the leaf springs 9 are deflected to a sufficient extent. The side walls 33 and/or intermediate walls 34 therefore limit deflection of the leaf springs 9 and thus prevent said leaf springs from being overloaded and therefore said leaf springs are not able to plastically deform or fracture.

However, an overload protection means for the push element 21 or the push element arm can be realized at the same time. On account of the limited deflection of the leaf springs 9, only a limited intermediate space can be created between two leaf springs which are associated with one another. If the maximum width of the section of the push element arm 23, which enters between the leaf springs 9, is greater than the intermediate space between the leaf springs 9 which are deflected to the maximum extent, the push element arm can be deflected only to a limited extent, and therefore said push element arm cannot be subjected to excessive loading either and fracture of the push element arm 23 is effectively avoided.

An overload protection means for the push element 21 or the push element arm 23 thereof can also be achieved by a stop being provided on that section of the push element arm 23 which enters between the leaf springs 9, said stop resting on the leaf springs 9 or on the run-on slopes 12 in the case of a maximum deflection of the push element arm or in the case of a maximum immersion depth, and therefore further deflection of the push element arm is prevented and damage to the push element 21 is avoided.

LIST OF REFERENCE SYMBOLS

1 Connection terminal
2 Insulating material housing
3 Conductor insertion opening
4 Contact frame
5 Electrical conductor
6 End, which is stripped of insulation, of the electrical conductor
7 Printed circuit board
8 Channel inlet
9 Leaf springs
10 Clamping edge
11 Contact base
12 Run-on slope
13 Turned-out portion of the free end of the leaf spring
14 Front latching hook
15 Rear latching hook
16 Contact regions
17 Front latching recess
18 Housing upper face
19 End face
20 Housing rear face
21 Push element
22 Housing recess
23 Push element arm
24 First push element arm part
25 Second push element arm part
26 Push element surface
27 Operating surface
28 Conductor track, contact section
30 Conductor insertion region
31 Housing inner wall
32 Recess
33 Side wall
34 Intermediate wall

The invention claimed is:
1. An electrical connection terminal for a clamping connection of at least one electrical wire, comprising:

an insulating material housing including a conductor insertion opening for receiving the at least one electrical wire; and a contact frame accommodated in the insulating material housing, the contact frame including a conductor clamping connection formed from a flat metal part shaped in the form of a channel having at least two side walls and a contact base, the conductor clamping connection having on each side wall a leaf spring in the form of a tongue formed from the flat metal part, the leaf spring being bent out of a plane of the flat metal part such that a free end of the leaf spring forms a clamping edge directed toward the electrical wire, and a conductor insertion region having sections in the form of a funnel in a direction of a clamping point formed by the clamping edge, the conductor insertion region adjoining the conductor insertion opening in a conductor insertion direction, wherein the conductor insertion region is at least virtually closed over a circumference, and the funnel-like conductor insertion region is formed jointly from the contact frame and the insulating material housing.

2. The electrical connection terminal according to claim 1, wherein the contact base is bent out of the plane of the flat metal part and is inclined toward an inserted electrical wire in the conductor insertion direction.

3. The electrical connection terminal according to claim 1, wherein the insulating material housing has a housing inner wall in the region of the conductor insertion region, said housing inner wall being inclined toward an inserted electrical wire in the conductor insertion direction.

4. The electrical connection terminal according to claim 1, wherein the contact frame has two contact regions for making contact with at least one conductor track on a printed circuit board.

5. The electrical connection terminal according to claim 1, wherein, for the purpose of forming the clamping edge, the free end of the leaf spring has a turned-out portion which is directed toward the electrical wire.

6. The electrical connection terminal according to claim 1, wherein one run-on slope is directed toward the outer face of the electrical connection terminal is integrally formed on the leaf springs, said run-on slopes being turned out in relation to one another in the form of a funnel.

7. The electrical connection terminal according to claim 6, wherein an operating element which is in the form of a push element is integrally formed on the insulating material housing, said push element being movable between the leaf springs via the run-on slopes to open the clamping connection of the electrical wire by pushing apart the leaf springs.

8. The electrical connection terminal according to claim 7, wherein deflection of the push element is limited by abutment of the push element against at least one leaf spring.

9. The electrical connection terminal according to claim 1, wherein the contact frame is connected to the insulating material housing via at least one latching connection.

10. The electrical connection terminal according to claim 1, further comprising an overload protection device for the leaf springs and/or the push element.

11. The electrical connection terminal according to claim 10, wherein deflection of the leaf spring is limited by side walls and/or intermediate walls of the insulating material housing.

* * * * *